US012446690B2

(12) United States Patent
Julius

(10) Patent No.: US 12,446,690 B2
(45) Date of Patent: Oct. 21, 2025

(54) ROLLING STACK SHELVING ASSEMBLY

(71) Applicant: Taylor Julius, Wichita, KS (US)

(72) Inventor: Taylor Julius, Wichita, KS (US)

(*) Notice: Subject to any disclaimer, the term of this patent is extended or adjusted under 35 U.S.C. 154(b) by 123 days.

(21) Appl. No.: 18/402,369

(22) Filed: Jan. 2, 2024

(65) Prior Publication Data
US 2024/0172868 A1 May 30, 2024

(51) Int. Cl.
A47B 96/02 (2006.01)
A47B 53/02 (2006.01)
B65G 1/02 (2006.01)

(52) U.S. Cl.
CPC ............ *A47B 96/025* (2013.01); *A47B 53/02* (2013.01); *B65G 1/02* (2013.01)

(58) Field of Classification Search
CPC .......... A47B 96/025; A47B 53/02; B65G 1/02
See application file for complete search history.

(56) References Cited

U.S. PATENT DOCUMENTS

| | | |
|---|---|---|
| 3,757,967 A | 9/1973 | Colbridge |
| 3,828,680 A | 8/1974 | Farren |
| 3,944,309 A * | 3/1976 | Taniwaki ............... A47B 53/02 105/104 |
| 4,017,131 A | 4/1977 | Camenisch |
| 4,229,135 A | 10/1980 | Malmros |
| 4,432,589 A * | 2/1984 | Sattel ..................... F21V 33/00 362/396 |
| 4,453,641 A * | 6/1984 | Rasmussen ............. B65G 1/08 211/151 |
| 4,527,680 A * | 7/1985 | Sato ....................... A47B 53/02 74/552 |
| 4,618,031 A | 10/1986 | Belloche |

(Continued)

FOREIGN PATENT DOCUMENTS

EP 2330058 B1 2/2014
WO WO2022233681 A1 11/2022
(Continued)

OTHER PUBLICATIONS

High Density Mobile Shelving, Nationwide Shelving, nationwideshelving.com, Jul. 18, 2019.
(Continued)

*Primary Examiner* — Ko H Chan
(74) *Attorney, Agent, or Firm* — Kenneth H. Jack; Davis & Jack, L.L.C.

(57) ABSTRACT

A Storage Assembly incorporating a plurality of shelves arranged in a longitudinal series; a plurality of rollers mounted at lower ends of the shelves, the rollers being oriented to facilitate longitudinal or oppositely longitudinal movements of the shelves; a plurality of linear motion actuator arms having a proximal and distal ends, and having an upper catwalk floor, each of the arms' distal ends being fixedly attached to one of the shelves; a plurality of rack gears fixedly attached to the linear motion actuator arms; a plurality of pinion gears rotatably mounted upon the shelves, each pinion gear engaging one of the rack gears for, upon rotations and counter-rotations of the pinion gears, longitudinally or oppositely longitudinal moving the rack gears, the catwalk floors, and the shelves; and a plurality of crank actuated chain drives connected operatively to the pinion gears.

18 Claims, 11 Drawing Sheets

(56) References Cited

U.S. PATENT DOCUMENTS

| | | | |
|---|---|---|---|
| 4,955,489 A | | 9/1990 | Allen |
| 5,114,024 A | * | 5/1992 | Meissner ................ B65G 1/02 |
| | | | 211/175 |
| 5,366,335 A | | 11/1994 | Tokiwa |
| 5,413,191 A | | 5/1995 | Kerr |
| 6,042,321 A | | 3/2000 | Labell |
| 6,068,141 A | | 5/2000 | Mulholland |
| 9,408,461 B2 | | 8/2016 | Knoll |
| 11,203,872 B2 | | 12/2021 | Hilgendorf et al. |
| 11,478,079 B2 | | 10/2022 | Hartmannet et al. |
| 2010/0158648 A1 | | 6/2010 | Schaefer |
| 2021/0137264 A1 | * | 5/2021 | French ..................... A47F 7/00 |
| 2022/0018143 A1 | | 1/2022 | Pennington |

FOREIGN PATENT DOCUMENTS

| | | |
|---|---|---|
| WO | WO2023115090 A1 | 6/2023 |
| WO | WO2023115089 A1 | 9/2023 |

OTHER PUBLICATIONS

Rapid Mobile Shelving System With 9 Bays Of Rapid 2 (2010h × 4000w × 3760d) rapidracking.com. Accessed: Sep. 26, 2023.

Mobile Pallet Racking daifuku.com. Accessed: Sep. 26, 2023.

Sliding Storage Shelves—48 × 138 × 74, uline.com. Accessed: Sep. 26, 2023.

Heavy-Duty Mobile Storage Racking spacesaver.com. Accessed: Sep. 26, 2023.

* cited by examiner

ROLLING STACK SHELVING ASSEMBLY

FIELD OF THE INVENTION

The instant invention is related to rolling stack shelving assemblies which are adapted for storage of various items. More particularly this invention relates to such assemblies which incorporate a drive mechanism for rollably moving the shelves of the assembly between a space saving stacked configuration and an access facilitating configuration.

BACKGROUND OF THE INVENTION

Rolling stack shelf or storage rack assemblies commonly are undesirably configured in a manner which provides limited accessibility storage areas at the raised upper ends of the shelves, due to limited height and upward reaches of workers who may walk between the rollably separated shelves. The instant inventive rolling stack shelving assembly solves or ameliorates such problems, defects, and deficiencies by providing specially configured catwalk structures in combination with linear motion actuators which facilitate worker access between shelves at the shelves' upper ends.

BRIEF SUMMARY OF THE INVENTION

A first structural component of the instant inventive rolling stack shelving assembly comprises a plurality of shelves which are ordered or arranged in a longitudinal series. The shelving unit components of the assembly are considered to include conventional shelves which present a flat lower articles storage surfaces along with variously configured articles storage racks. Articles holding storage racks are considered to constitute shelves and to fall within the scope of the invention. In a preferred embodiment, each shelf among the instant inventions plurality of shelves is laterally oblongated and has a shelf height or vertical dimension in excess of that which may be easily accessed by a worker standing upon a floor surface between the shelves.

Further structural components of the instant inventive assembly comprise a plurality of rollers which are rotatably or rollably mounted at the lower ends of the shelves. In a preferred embodiment, at least four rollers are rollably mounted at the lower end of each shelf, one roller at each of the shelfs' corners. In the preferred embodiment, rotation axes which support the rollers extend laterally to facilitate longitudinal or oppositely longitudinal rolling movements of the shelves toward and away from each other. Spherical rollers or ball bearings are considered to constitute rollers within the scope and meaning of the invention. Floor mounted lateral and oppositely lateral roller tracks are preferably additionally provided.

A further structural component of the instant inventive assembly comprises a plurality of catwalks, each catwalk having an oppositely longitudinal end which is fixedly attached to a longitudinal end of one of the shelves. Each of the catwalks preferably extends longitudinally and substantially horizontally from its fixedly attached oppositely longitudinal end. In a preferred embodiment, the catwalks are substantially ridged and are laterally oblongated, the catwalks preferably having a longitudinal width sufficient to allow a worker to stand thereon and walk laterally there along. In addition to constituting and functioning as a catwalk, each of the instant invention's catwalk components is adapted to constitute and function as a linear motion actuator arm.

Further structural components of the instant inventive assembly comprise a plurality of rack gears which are fixedly attached to under surfaces of the catwalk/linear motion actuator arm components. In a preferred embodiment, at least a pair of rack gears is mounted beneath each of the catwalks, the paired rack gears being positioned at a catwalk's lateral and oppositely lateral ends. Each rack gear preferably extends longitudinally to facilitate gear driven longitudinal and oppositely longitudinal motions of the catwalks.

Further structural components of the instant inventive assembly comprise a plurality of pinion gears, each pinion gear being rotatably mounted upon one of the shelves. In the preferred embodiment, each pinon gear engages one of the rack gears for, upon powered rotations and counter rotations of the pinion gears, moving the rack gears longitudinally or oppositely longitudinally. The catwalk structures and the shelving units which are connected to the longitudinally and oppositely longitudinally positioned rack gears are correspondingly driven longitudinally or oppositely longitudinally. Accordingly, rotation of the pinion gears which are mounted upon one of the shelves may advantageously oppositely longitudinally drive an engaged rack gear while simultaneously driving such gears' catwalk, along with the shelving unit which is fixedly attached to the oppositely longitudinal end of the catwalk. Such pinion gear rotation may operatively drive an adjacent pair of the shelves longitudinally away from each other, creating a worker access space or walkway.

In the preferred embodiment, each of the catwalk, rack gear, and pinion gear assemblies is mounted between 7½ feet and 8½ feet above a floor surface upon which the shelving assembly rests, such vertical positioning allowing workers to walk beneath the catwalks which may span between separated shelving units. Counter rotation of the pinion gears may advantageously draw longitudinally adjacent shelving units toward each other, returning the rolling shelves to their abutting stacked configuration for purposes of space economy.

Further structural components of the instant inventive assembly comprise turning means which are connected operatively to the pinion gears. While the turning means may suitably comprise an electric motor-powered rotary drive train, the turning means preferably comprise a manually actuated rotary powered means. The preferred provision of manually actuated turning means advantageously eliminates extensions of electric power cables to the movable shelving units or eliminates shelf mounted electric battery power units. In a preferred embodiment, the turning means comprise a hand crank actuated rotary sprocket and continuous loop chain drive assemblies.

In a preferred embodiment, a single catwalk/linear motion actuator arm component spans between and interconnects each adjacent pair of rolling shelves. Suitably, vertically paired or vertically tiered catwalks may span between the shelves, effectively providing an enhanced capacity three-story shelving unit.

Accordingly, objects of the instant invention include the provision of rolling stack shelving assembly which incorporate structures as described above and which arranges these structures in relation to each other in the manners described above for the achievement of the above-described functional objectives. Other and further objects, benefits, and advantages of the instant invention will become known to those skilled in the are upon review of the detailed description which follows, and upon review of the appended drawings.

DETAILED DESCRIPTION OF THE INVENTION

Figure 1:
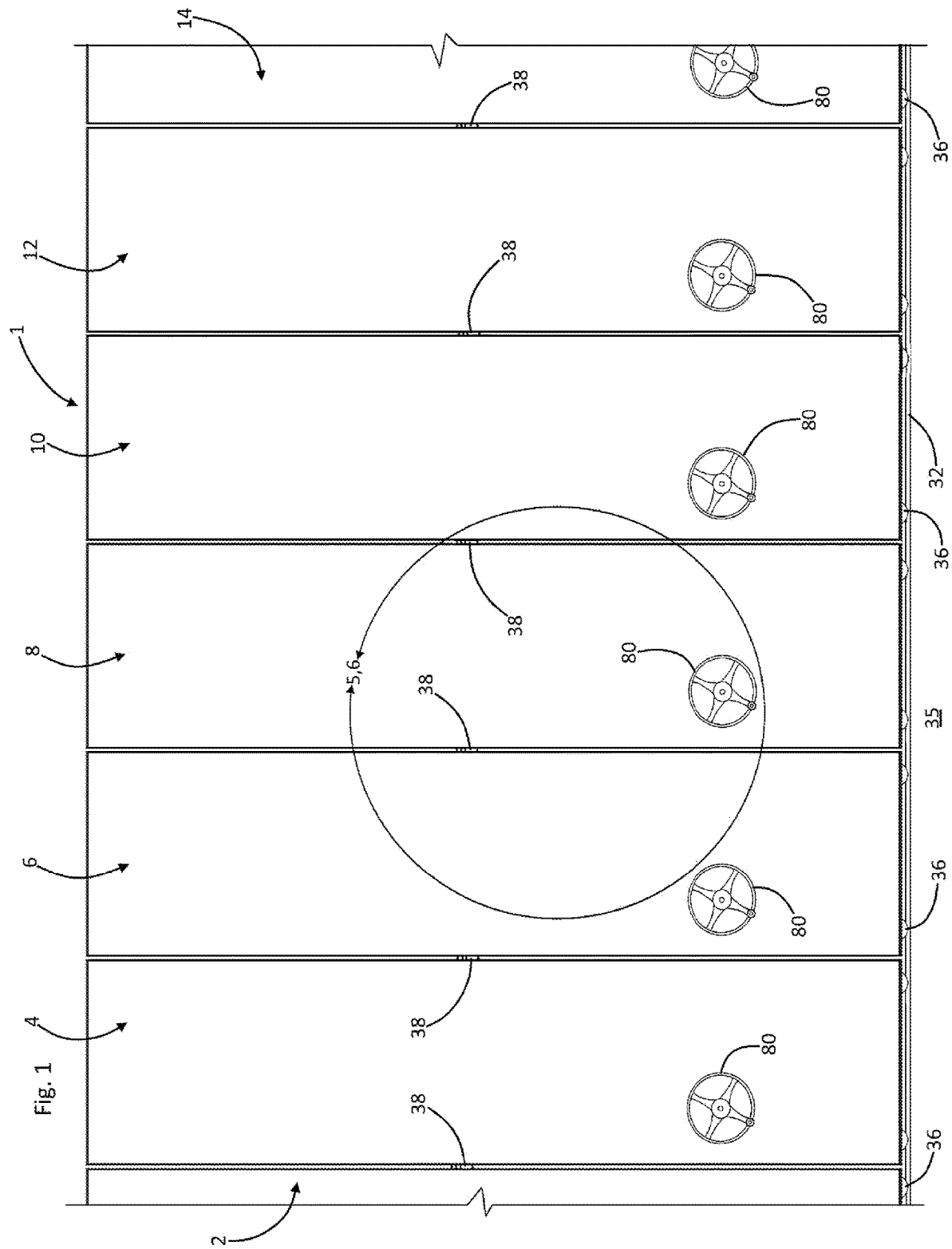
FIG. 1 is a lateral side view of the instant inventive rolling stacked shelving assembly.

Referring now to the drawings, and in particular to drawing FIG. 1, a preferred embodiment of the instant inventive rolling stacked shelving assembly is referred to generally by reference arrow 1. The assembly 1 suitably comprises a plurality of shelf units 2, 4, 6, 8, 10, 12, 14, such shelves being compactly ordered and arranged in an abutting longitudinally extending series. The seven shelves depicted in FIG. 1 are intended as being representative of series of any number of longitudinally stacked and arranged rolling shelving unit.

Figure 4:
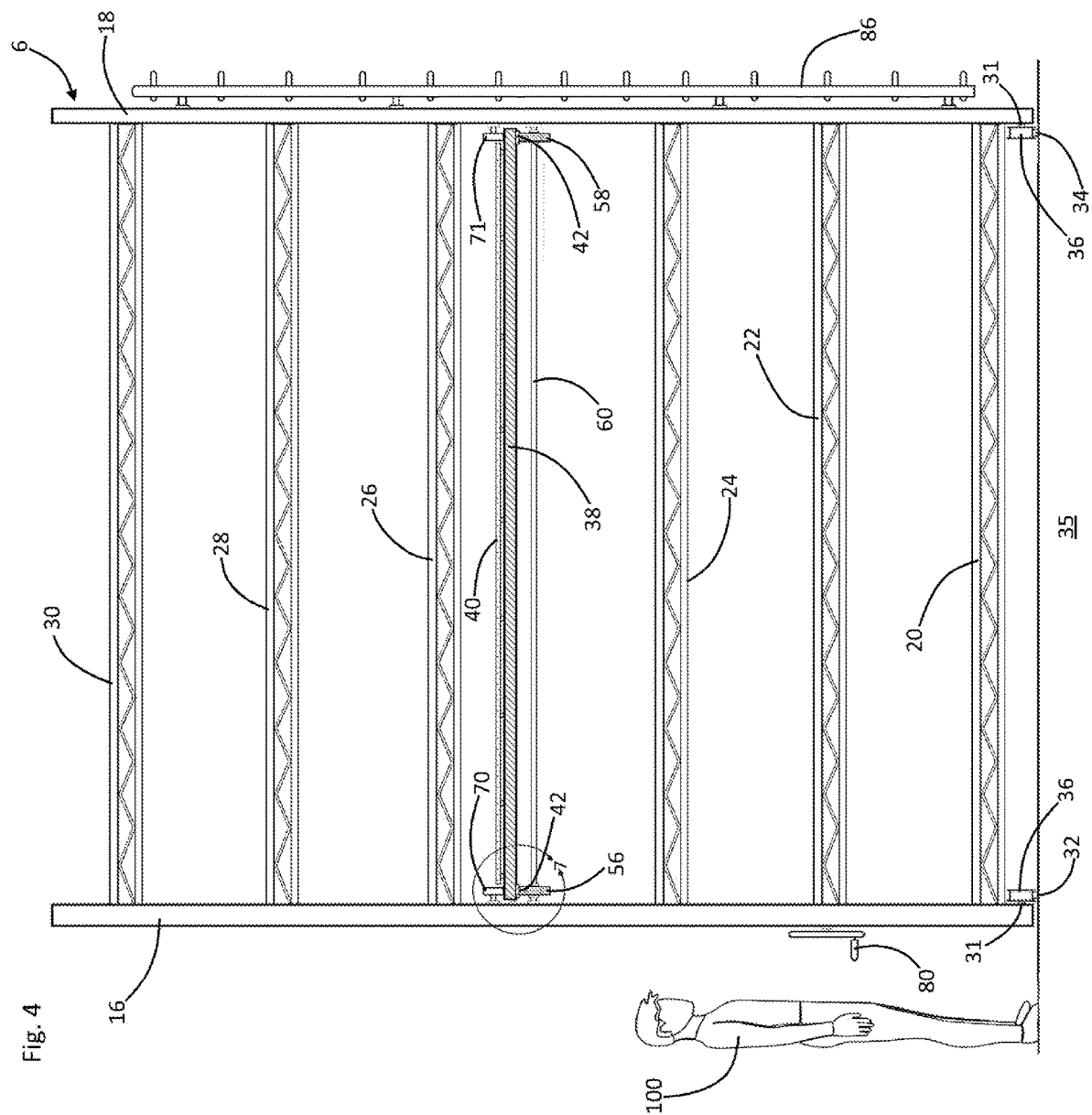
FIG. 4 is a sectional and longitudinal view as indicated in FIG. 3.

Rollers 36 are rotatably mounted at the lower ends of shelving units 2-14, such rollers engaging lateral and oppositely lateral roller tracks 32 and 34 which are embedded within or securely mounted upon a floor surface 35. During rolling operation of the rollers 36 upon such lateral and oppositely lateral tracks 32 and 34, the shelving units 2-14 may freely rollably move in the longitudinal or oppositely longitudinal directions, such directions being rightwardly or leftwardly according to the view of FIG. 1. Referring in particular to FIG. 4, roller axles 31 which rotatably mount and support the rollers 36 extend in the lateral and oppositely lateral directions, such axle orientations facilitating the longitudinal rolling motions of the shelving units.

Figure 2:
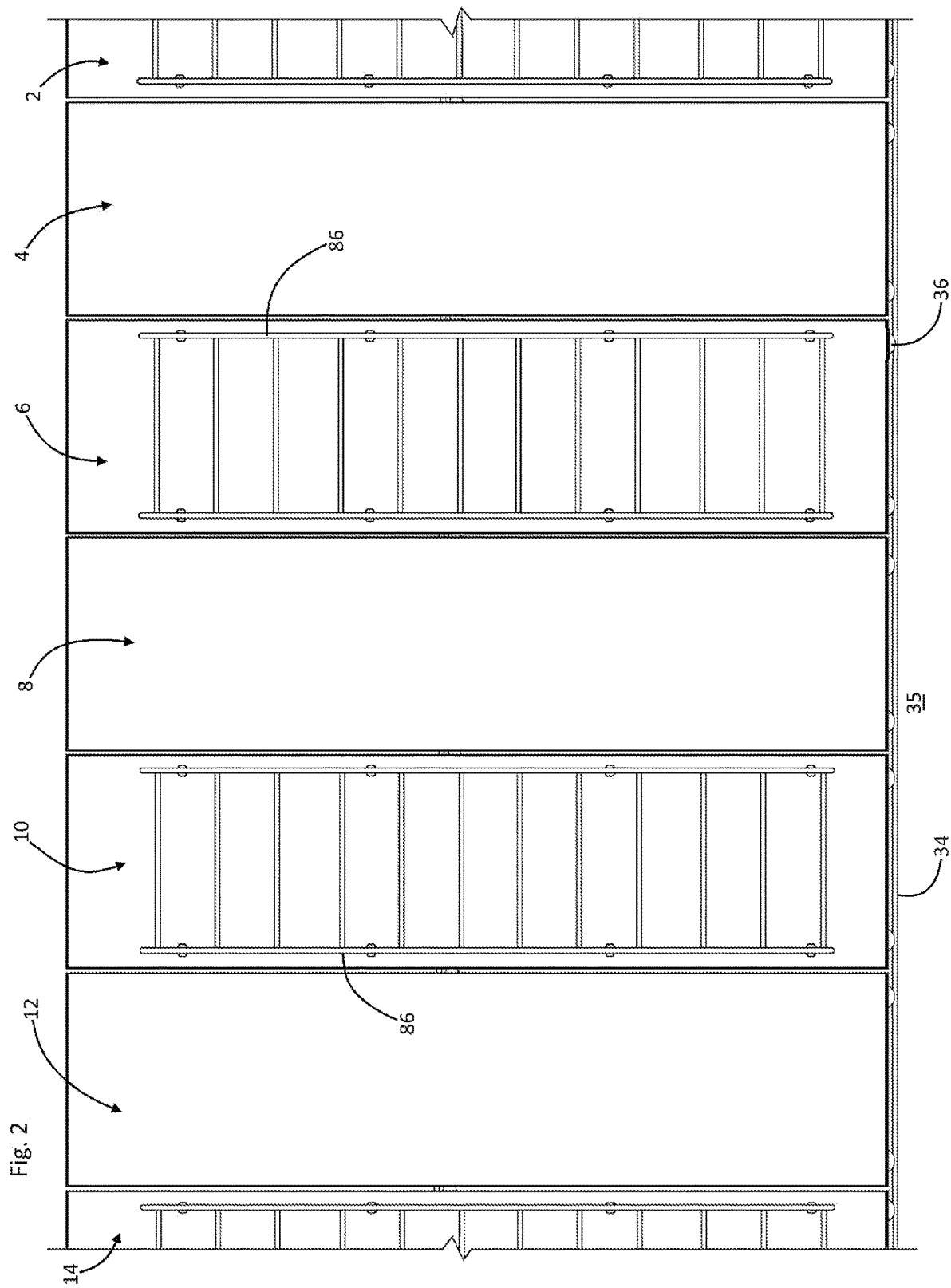
FIG. 2 is an oppositely lateral side view of the assembly of FIG. 1.

Referring simultaneously to FIGS. 1, 2, and 4, each of the shelving units 2, 4, 8, 10, 12, and 14 is preferably configured substantially identically with shelving unit 6, the longitudinal view of which appears in FIG. 4. Such shelving units have a lateral vertical support member 16, an oppositely lateral vertical support member 18, and include vertical series of shelf structures 20, 22, 24, 26, 28, and 30 which span laterally therebetween. Such lateral spanning shelves 20-30 are considered as being representative of other commonly configured storage surface and storage bracket assemblies.

Figure 3:
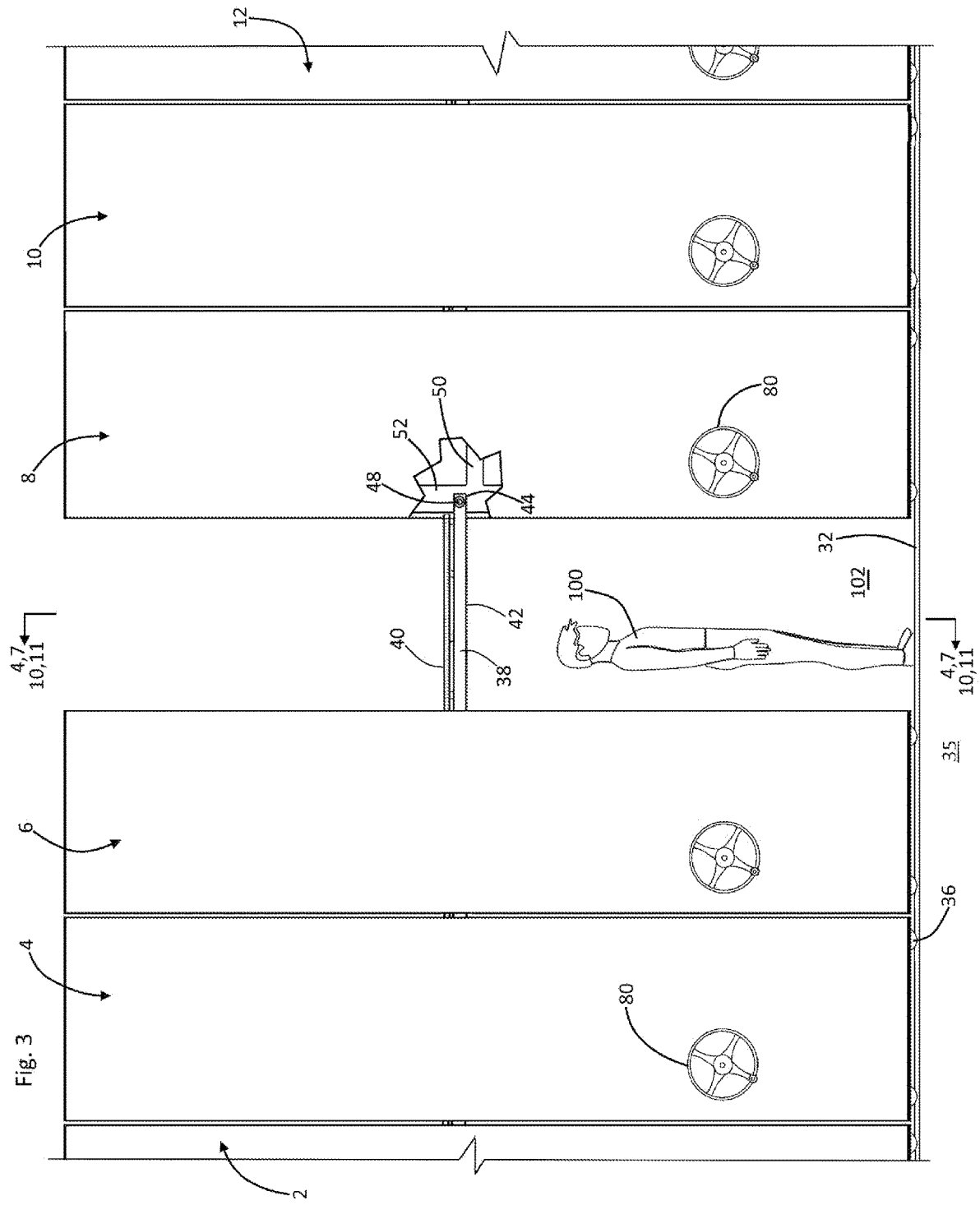
FIG. 3 re-depicts the assembly of FIG. 1, the view of FIG. 3 showing longitudinal displacement and spacing of shelf units.

Referring to FIG. 3, the instant inventive assembly preferably further comprises a plurality of catwalks 38, each of the catwalks preferably having a longitudinal width sufficient to allow a worker 100 to stand and work thereon or thereunder. As shown in FIG. 4, each of the catwalk elements 38 is laterally oblongated to a length dimension sufficient to substantially span the full lateral width of the shelving units.

Each of the catwalk elements 38 preferably comprises a rigid and rectangular steel frame which supports at its upper end a high friction foot tread surface 40. As shown in FIG. 3, each of the catwalks 38, has an oppositely longitudinal or distal end 44, such end being fixedly attached to an oppositely longitudinally adjacent shelving unit (eg. unit 8 of FIG. 3). A nut and bolt fastener 48 suitably effects such fixed attachment upon, for example, a vertical interior frame component 52 within the shelving unit's lateral wall 16. Each of the distal ends of the assembly's catwalks 38 is preferably similarly fixedly attached to a longitudinal end of one of the shelving units 2-14.

Each of the catwalks 38 preferably presents a longitudinally extending series of rack gear teeth 42. As shown in FIG. 4, such rack gear teeth 42 are preferably arrayed in pairs at the lateral end and the oppositely lateral end of each catwalk 38. By virtue of the catwalks' presentation of such pairs lateral and oppositely lateral series of rack gear teeth 42, each catwalk 38 advantageously constitutes and may function as a linear motion actuator arm. Each of the assembly's catwalk components 38 dually constitutes a linear motion actuating arm and an access facilitating catwalk. Both functions facilitate worker access by creating shelf spacing for access and by supporting a worker within a created space.

Figure 7:
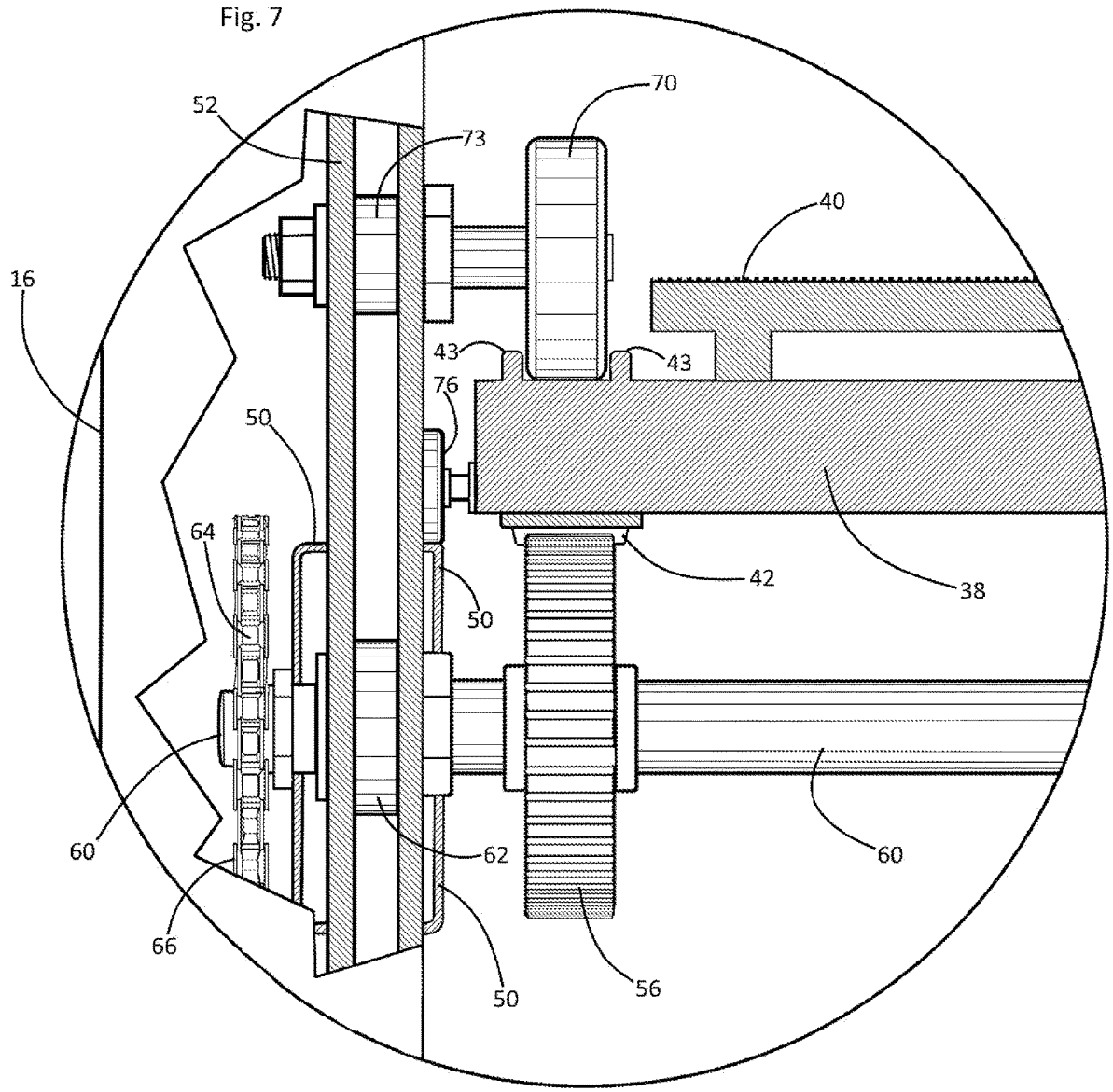
FIG. 7 is a magnified and partial view as indicated in FIG. 4, the view of FIG. 7 including a cutaway section for viewing of underlying structures.

Referring simultaneously to FIGS. 4 and 7, lateral and oppositely lateral pinion gears 56 and 58 are provided for engaging and for longitudinally or oppositely longitudinally driving the rack gears 42 along with their attached catwalks 38 and tread surfaces 40. To assure that the lateral and oppositely lateral pinion gears 56 and 58 precisely co-rotate, they are joined by a laterally spanning drive axle 60 which is rotatably mounted by bearings 62 upon the shelf unit's lateral and oppositely lateral walls 16 and 18.

Figure 5:
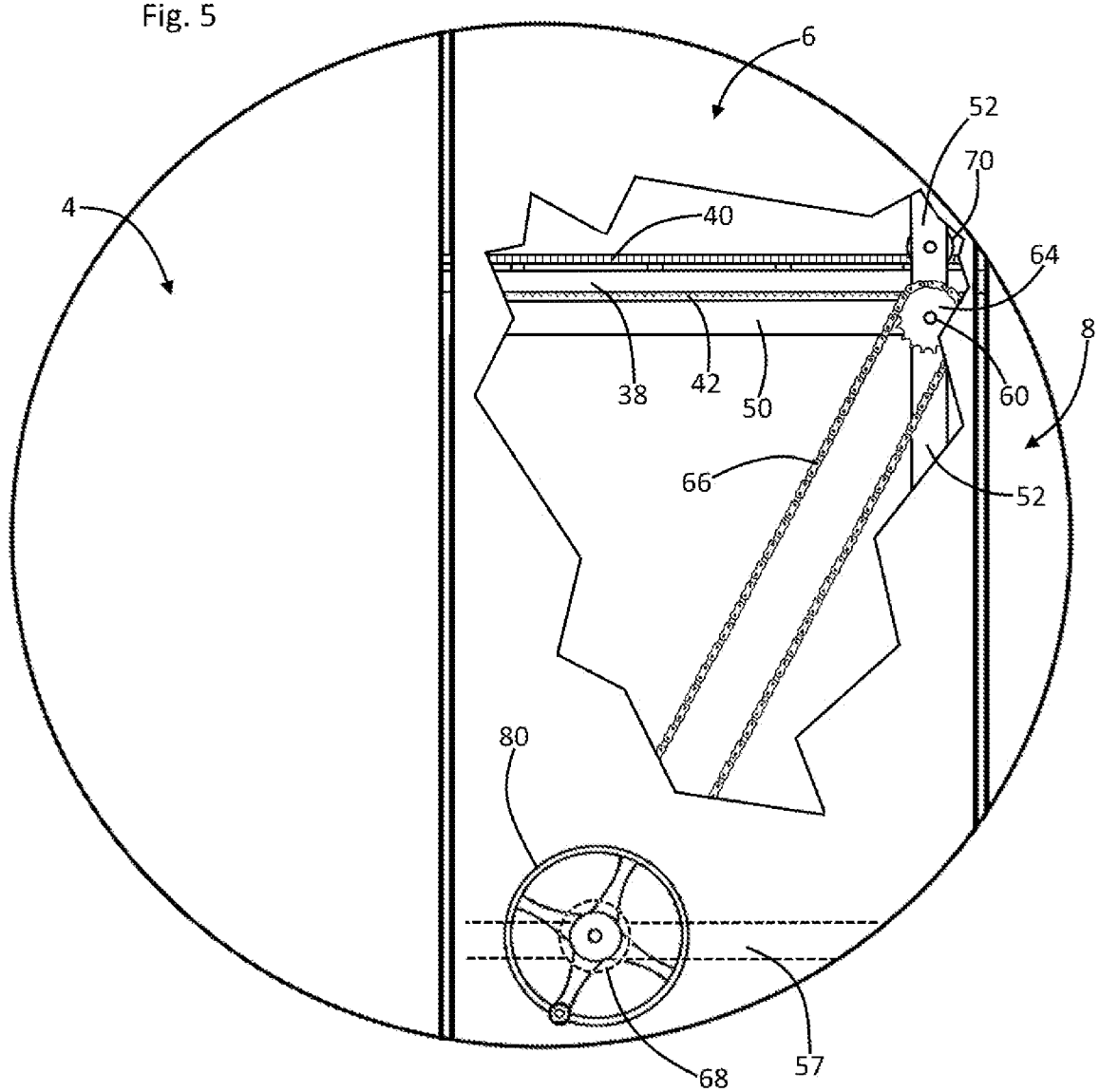
FIG. 5 is a magnified and partial view as indicated in FIG. 1, the view of FIG. 5 including a cutaway section for viewing of underlying structures.
Figure 6:
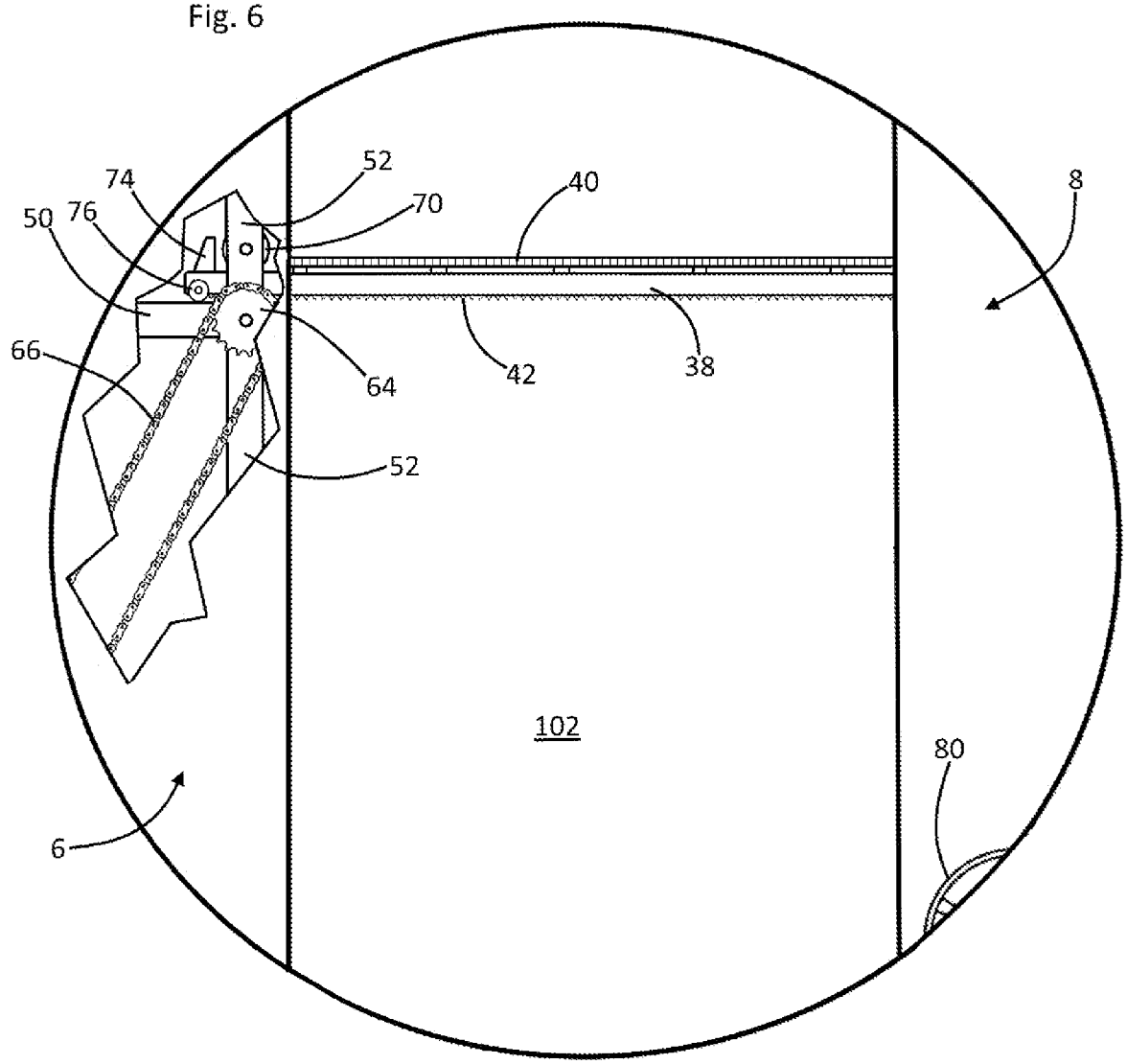
FIG. 6 re-depicts the structure of FIG. 5, the view showing the longitudinal displacement of shelving units indicated in FIG. 3.

Referring simultaneously to FIGS. 5-7, a driven sprocket 64 is rigidity mounted upon the laterally protruding and extreme lateral end of axle 60, such sprocket 64 co-rotating with the axle 60. The lateral pinion gear 56 and the oppositely lateral pinion gear 58 which are rigidly mounted at opposite ends of the drive axle 60 correspondingly co-rotate with the driven sprocket 64. A chain drive assembly including a continuous loop chain 66 and a lower drive sprocket 68 (shown in dashed lines upon FIG. 5) operatively drives and rotates the driven sprocket 64. The drive sprocket 68 is suitably mounted for rotation upon an internal frame member 57, and the upper chain driven sprocket 64 is suitably rotatably mounted upon horizontal and/or vertical internal frame members 50 and 52.

Referring further to FIG. 4, to hold the lateral and oppositely lateral ends of the catwalks 38 downwardly against and in engagement with the lateral and oppositely lateral pinion gears 56 and 58, lateral and oppositely lateral retention rollers 70 and 71 are respectively rotatably mounted upon the shelving units' lateral and oppositely lateral walls 16 and 18. While such rollers 70 and 71 bear downwardly upon upper end surfaces of the catwalk 38, the downwardly extending teeth of the rack gears 42 remain in engagement with the teeth on the pinion gears 56 and 58, as such gears rotatably cycle past their upper positions. Turn cranks or turn wheels 80 are exposed at the lateral surfaces of the shelving units' lateral walls for manual turning of the drive sprockets 68. The raised positions of the catwalks 38 and the rack gears 42 allow the teeth of the rack gear to extend downwardly, such positioning advantageously protecting the gear teeth from footsteps and debris accumulations.

In operation of the instant inventive rolling stacked shelving assembly, and referring simultaneously to FIGS. 1 and 4, an operator 100 may need to access, for example, storage locations at the longitudinal end of shelving unit 8 or at the oppositely longitudinal end of shelving unit 6. Such operator 100 may approach the turn wheel or turn crank 80 which is exposed at the lateral surface of the lateral wall 16 of shelving unit 6, and the operator may grasp such crank. Thereafter, the operator may manually turn the crank 80 in the clockwise direction. Referring further simultaneously to FIG. 5, such manual clockwise turning of the crank 80 correspondingly turns the drive sprocket 68, downwardly drawing the lower flight of the continuous loop chain 66, and simultaneously upwardly drawing the upper flight of such chain. Continuously cycling sprocket driven motion of the chain 66 simultaneously rotates the assembly's driven sprocket 64, simultaneously rotating axle 60 which is rigidly mounted to such sprocket.

Referring further to FIG. 7, such crank actuated rotation of the driven sprocket 64 simultaneously co-rotates sprockets 56 and 58, thereby oppositely longitudinally extending rack gears 42 along with their attached catwalk/actuator arm 38. Such chain and sprocket driven actuator arm motion moves the catwalk 38 from its longitudinally retracted and nesting position depicted in FIG. 5 to an oppositely longitudinally extended position depicted in FIG. 6, such catwalk extension simultaneously driving the shelving unit 6 and 8 longitudinally apart and away from each other, advantageously creating an access space or walkway 102.

To compactly close such access space 102, the operator 100 may reverse steps described above, turning the crank 80 counterclockwise to return the catwalk/linear motion actuator arm 38 to draw shelving units 6 and 8, along with shelving units 2, 4, 10, 12, and 14 together to their compact abutting and stacked configuration. The repetition of the steps described above applied to any of the turn cranks 80 of the shelving units 2-14 may advantageously separate and close similar access spaces 102 between the shelving units.

Referring simultaneously to FIGS. 5 and 6, proximal end support rollers 76 are suitably mounted at the lateral and oppositely ends of the proximal ends of catwalks 38, such rollers 76 supporting the proximal ends of the catwalks 38 while they occupy their longitudinally retracted positions. Such rollers 76 prevent undesirable downward deflections while the catwalks 38 occupy their retracted and nested configurations as depicted in FIG. 5. Rolling support of such rollers 76 may suitably be provided at the upper surface of cross members 50.

To prevent excess oppositely longitudinal extensions of the catwalks 38, and to prevent undesirable disengagements of the rack gears 42 from pinion gears 56 and 58, extensions stops 74 may suitably be mounted at the proximal ends of the catwalks in alignments with rollers 70 and 71. Longitudinally extending guide ridges 43 may be provided to resist lateral disengaging movements of the catwalks 38 in relation to the pinion gears 56 and 58.

Referring to FIGS. 2-4, it may be seen that the operator 100, while standing upon the floor surface 35, may walk within space 102 between shelving units to access any of the lower shelving units 20, 22, or 24. For the operator to 100 to be able to access upper shelves 26, 28, and 30, ladders 86 may be installed upon the end walls of the shelving units. Following a walkway creating separation of an adjacent pair of the shelving units in the manner described above, an operator may simply walk between or around the shelving units, climb an adjacent ladder 86, and may step onto the upper tread surface 40 of an exposed catwalk 38.

Figure 8:
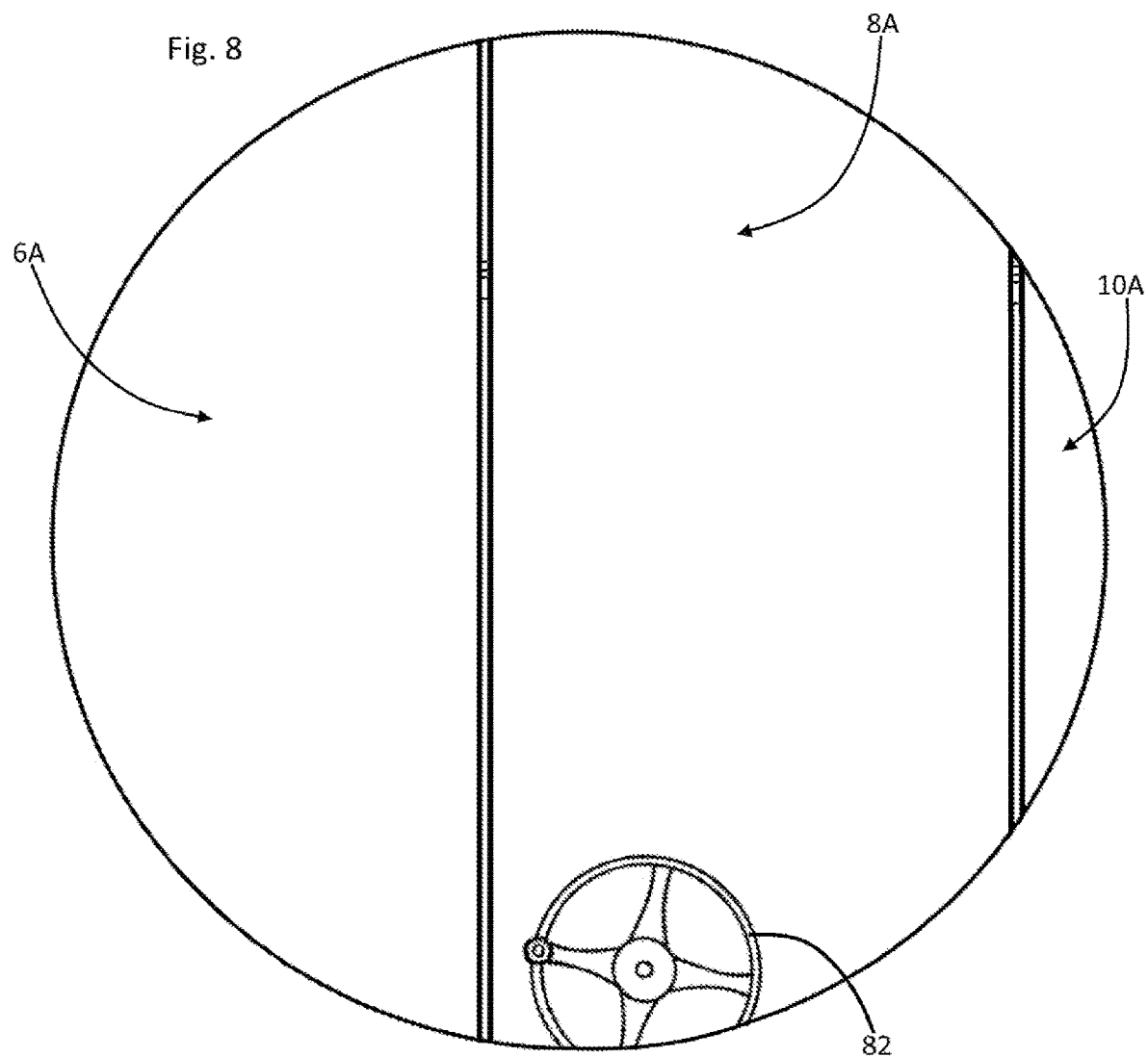
FIG. 8 presents an alternate configuration of the structure of FIG. 5.
Figure 9:
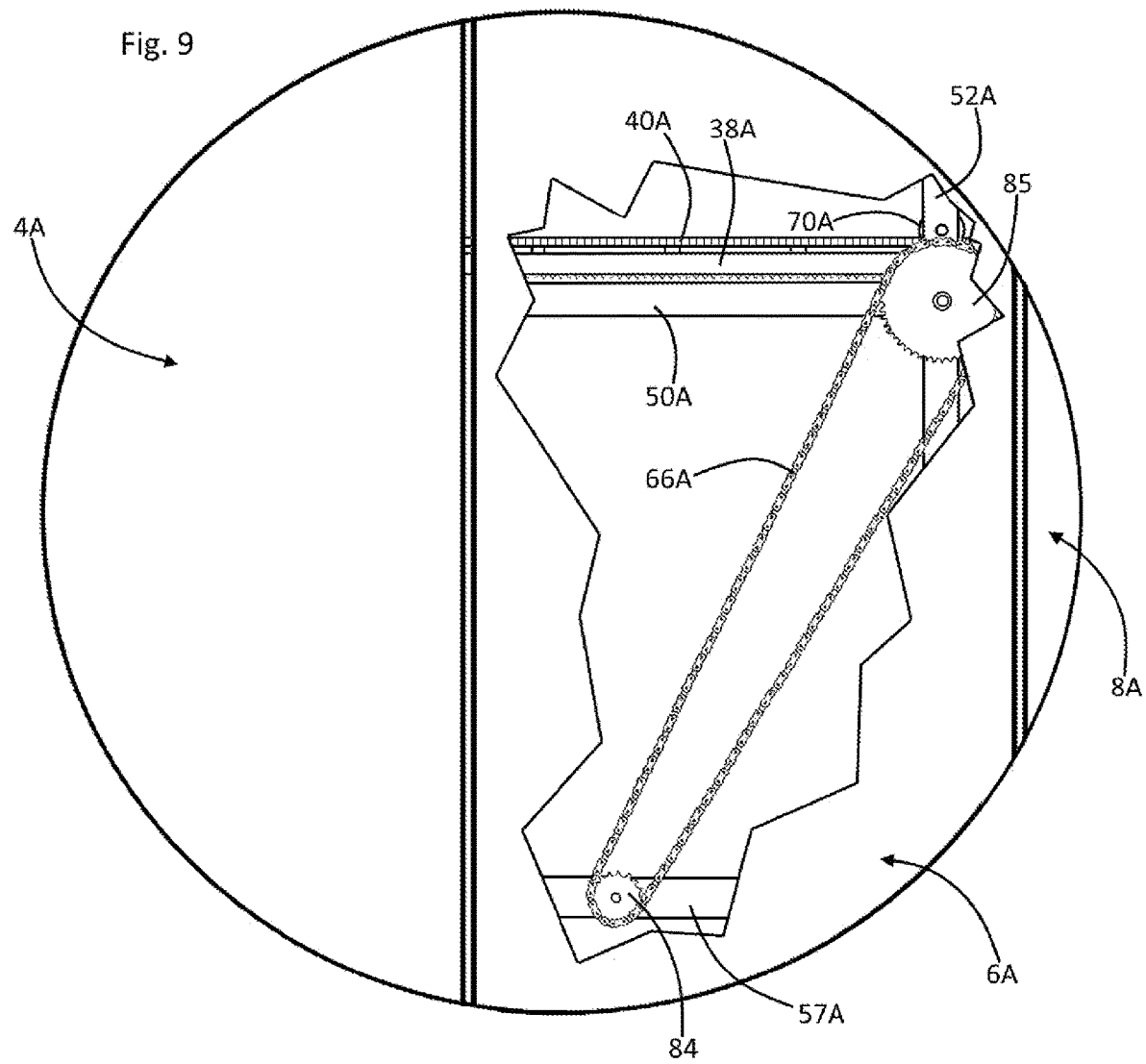
FIG. 9 re-depicts the structure of FIG. 8, the view of FIG. 9 including a cutaway section for viewing underlying structures.
Figure 10:
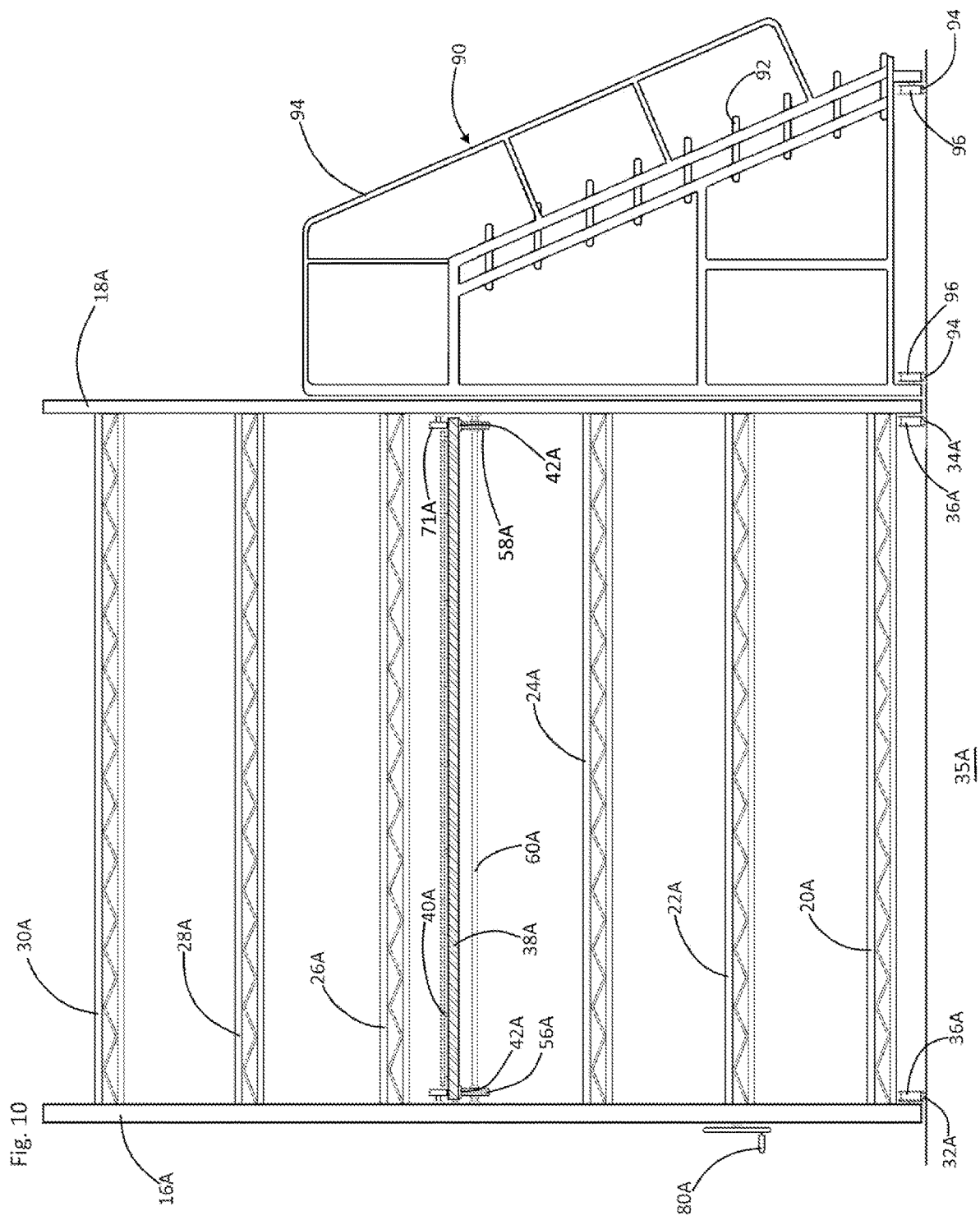
FIG. 10 presents an alternate configuration of the structure of FIG. 4.

Referring simultaneously to FIGS. 1-10, each structure drawn in FIG. 10 having a reference numeral followed by a suffix "A" is configured substantially identically with similarly numbered structures appearing in FIGS. 1-9. In the FIG. 10 alternative configuration, a rollable staircase 90 having lower rollers 96 which engage a second pair of lower tracks 94 may roll longitudinally and oppositely longitudinally along the oppositely lateral ends of the shelving units. To access an exposed catwalk 38A, the operator 100 may climb stair treads 92 in a more protected fashion. Guardrails 94 may help stabilize the operator while stored articles are carried to and from second story shelves 26A, 28A, or 30A.

Figure 11:
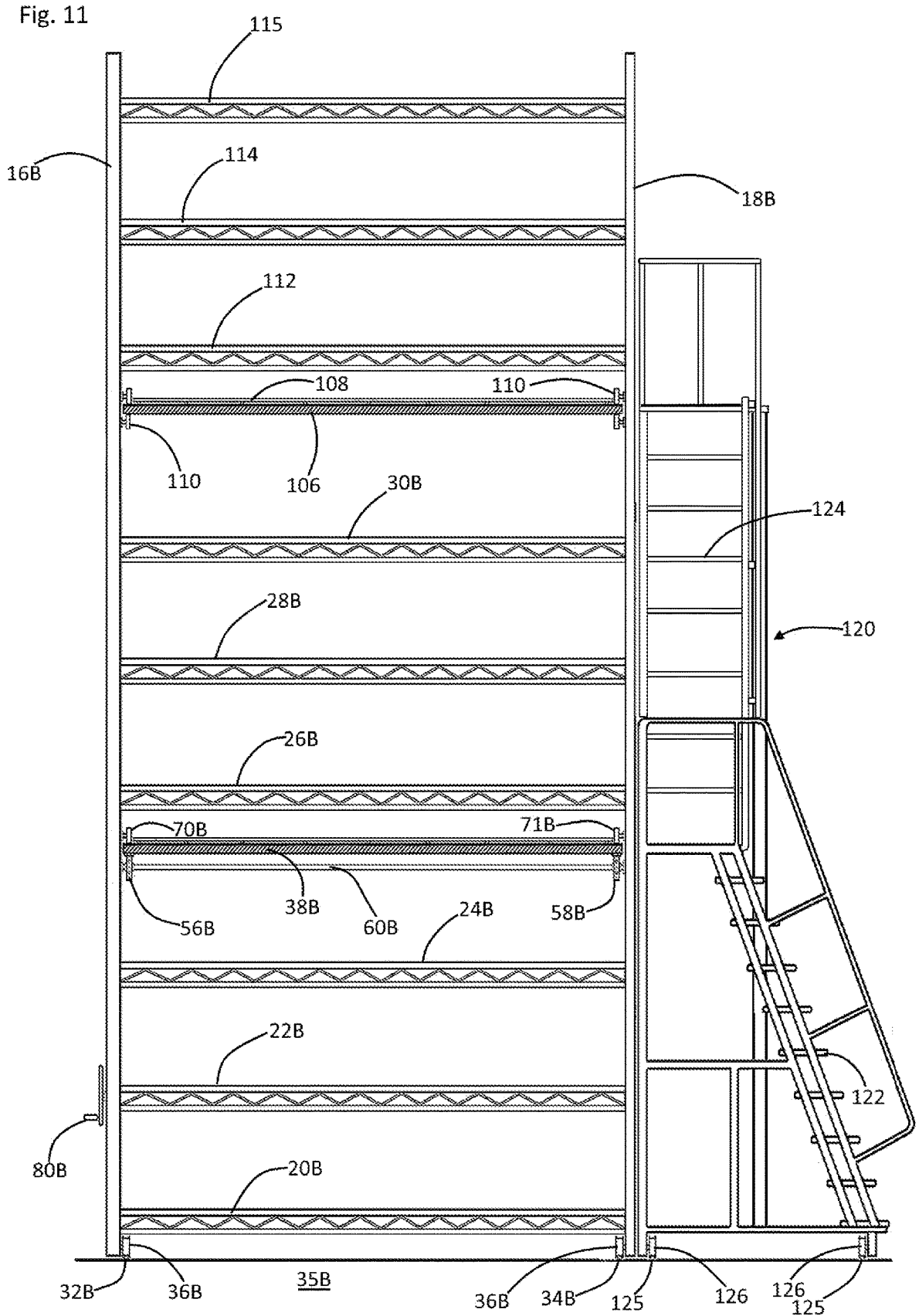
FIG. 11 presents a further alternative configuration of the structure of FIG. 4.

Referring further to FIG. 11, all structures identified by a reference numeral having the suffix "B" are configured similarly with similarly number structures appearing in FIGS. 1-10. In the FIG. 11 structural alternative, a second and overlying extendable and retractable catwalk 106 is provided. Catwalks 106 allow workers to additionally access extreme upper storage shelves 112, 114, and 115. Similarly with the lower catwalk 38B, the upper catwalks 106 present upper tread surfaces 108. In contrast with the underlying rack and pinon actuator driven catwalks 38B, the overlying or second story catwalks 106 of the FIG. 11 configuration may be passively and rollably supported upon lateral and oppositely lateral rollers 110.

As the shelving units of the FIG. 11 configuration are driven longitudinally and oppositely longitudinally toward and away from each other by the actions of the driven catwalks/linear motion actuator arms 38B, the overlying roller supported catwalks 106 correspondingly extend and retract. Where a vertical series of catwalks is provided as depicted in FIG. 11, a multistory staircase 120 may suitably be provided, such staircase 120 having a first flight of steps 122 which accesses the lower catwalks 38B, and having second story or upper flight of steps 124 for accessing the roller mounted upper catwalks 106. Such two-story staircase 120 may suitably be mounted upon rollers for selective longitudinal rolling movement along the shelving units.

Where heavy items are stored upon the multiple shelves of the shelving units, rolling friction and resistance to rolling at the assembly's lower rollers 36, 36A, or 36B as the case may be, may produce excessive resistance to the shelves' rolling motions along tracks 32 and 34. Referring simultaneously to FIGS. 5 and 8, an increased diameter turn crank 82 may be provided increase the torque which is manually applied to the system's chain drive and rack and pinon actuator. Referring further to FIG. 9, provide additional actuator driving torque, the diameter of the assembly's lower drive sprockets 84 may be decreased, while the diameter of the assemblies' upper driven sprockets 82 may be increased. Decreasing the diameter of pinion gears 56 and 58 may additionally mechanically enhance the longitudinal driving force of the actuator arm/catwalks 38.

It may be noted that in conventionally configured rolling stack shelving assemblies, floor mounted rack gears having upwardly extending teeth are often utilized. The instant inventive assembly, through its adaptation of extendable and retractable catwalks to function as linear motion actuator arms, advantageously exposes arm undersurfaces as mounting locations for rack gears. Accordingly, the instant inventive assembly allows and facilitates the downward extension of the rack gears teeth, such orientation protecting such teeth from treading foot traffic, and protecting such teeth from accumulation of potentially gear jamming dirt and debris.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A Storage Assembly comprising;
   a. A plurality of shelves arranged in a longitudinal series;
   b. A plurality of rollers, each roller being mounted at a lower end of one of the shelves, the rollers being oriented to facilitate longitudinal or oppositely longitudinal movements of the shelves;
   c. A plurality of catwalks, each catwalk being fixedly attached to and extending longitudinally from one of the shelves;
   d. A plurality of rack gears, each rack gear being fixedly attached to one of the catwalks;
   e. A plurality of pinion gears, each pinion gear being rotatably mounted upon one of the shelves, said each pinion gear engaging one of the rack gears for, upon rotations and counter-rotations of said each pinion gear, moving said one of the rack gears longitudinally or oppositely longitudinally; and
   f. A plurality of turning means, each turning means being connected operatively to one of the pinion gears.

2. The Storage Assembly of claim 1, wherein, the turning means comprise a plurality of axles, each axle operatively spanning between a pair of the pinion gears.

3. The Storage Assembly of claim 2, wherein, the rack gears are laterally paired for engagements with the pairs of pinion gears.

4. The Storage Assembly of claim 3, wherein, the turning means further comprise a plurality of toothed sprockets, each toothed sprockets being connected operatively to one of the axles.

5. The Storage Assembly of claim 4, wherein, the turning means further comprise a plurality of continuous loop chains, each continuous loop chain engaging a pair of sprockets among the plurality of toothed sprockets.

6. The Storage Assembly of claim 5, wherein, the turning means further comprise a plurality of cranks, each crank being connected operatively to one of the toothed sprockets.

7. The Storage Assembly of claim 6, wherein each rack gear comprises a multiplicity of downwardly extending gear teeth.

8. The Storage Assembly of claim 7, wherein, each shelf has a lateral end and an oppositely lateral end, and further comprising lateral and oppositely lateral roller tracks respectively underlying said shelf ends, said roller tracks operatively engaging the rollers.

9. The Storage Assembly of claim 8, further comprising at least a first ladder, the at least first ladder being operatively positioned at a lateral end of the plurality of shelves.

10. A Storage Assembly comprising;
    a. A plurality of shelves arranged in a longitudinal series;
    b. A plurality of rollers, each roller being mounted at a lower end of one of the shelves, the rollers being oriented to facilitate longitudinal or oppositely longitudinal movements of the shelves;
    c. A plurality of linear motion actuator arms, each linear motion actuator arm having a proximal end, a distal end, and an upper catwalk floor, said each arm's distal end being fixedly attached to one of the shelves;
    d. A plurality of rack gears, each rack gear being fixedly attached to one of the linear motion actuator arms;
    e. A plurality of pinion gears, each pinion gear being rotatably mounted upon one of the shelves, said each pinion gear engaging one of the rack gears for, upon rotations and counter-rotations of said each pinion gear, moving said one of the rack gears longitudinally or oppositely longitudinally; and
    f. A plurality of turning means, each turning means being connected operatively to one of the pinion gears.

11. The Storage Assembly of claim 10, wherein, the turning means comprises a plurality of axles, each axle operatively spanning between a pair of the pinion gears.

12. The Storage Assembly of claim 11, wherein, the rack gears are laterally paired for engagements with the pairs of pinion gears.

13. The Storage Assembly of claim 12, wherein, the turning means comprise a plurality of toothed sprockets, each toothed sprocket being connected operatively to one of the axles.

14. The Storage Assembly of claim 13, wherein, the turning means further comprise a plurality of continuous loop chains, each continuous loop chain engaging a pair of sprockets among the plurality of toothed sprockets.

15. The Storage Assembly of claim 14, wherein, the turning means further comprise a plurality of cranks, each crank being connected operatively to one of the toothed sprockets.

16. The Storage Assembly of claim 15, wherein each rack gear comprises a multiplicity of downwardly extending gear teeth.

17. The Storage Assembly of claim 16, wherein, each shelf has a lateral end and an oppositely lateral end, and further comprising lateral and oppositely lateral roller tracks respectively underlying said shelf ends, said roller tracks operatively engaging the rollers.

18. The Storage Assembly of claim 17, comprising a staircase positioned laterally from the plurality of shelves, and further comprising a second pair of roller tracks, the staircase being rollably mounted upon the second pair of roller tracks.

* * * * *